United States Patent
Bekolay (10) Patent No.: US 10,984,309 B2
(45) Date of Patent: Apr. 20, 2021

(54) METHODS AND SYSTEMS FOR CONTINUOUS STATE ESTIMATION AND SIGNAL CLASSIFICATION WITH DYNAMIC MOVEMENT PRIMITIVES

(71) Applicant: Applied Brain Research Inc., Waterloo (CA)

(72) Inventor: Trevor Bekolay, West Lebanon, NH (US)

(73) Assignee: Applied Brain Research Inc., Waterloo (CA)

( * ) Notice: Subject to any disclaimer, the term of this patent is extended or adjusted under 35 U.S.C. 154(b) by 1016 days.

(21) Appl. No.: 15/434,216

(22) Filed: Feb. 16, 2017

(65) Prior Publication Data
US 2018/0232633 A1    Aug. 16, 2018

(51) Int. Cl.
*G06N 3/04* (2006.01)
*G06N 3/08* (2006.01)

(52) U.S. Cl.
CPC .......... *G06N 3/0445* (2013.01); *G06N 3/08* (2013.01)

(58) Field of Classification Search
CPC .............................. G06N 3/0445; G06N 3/08
See application file for complete search history.

(56) References Cited

PUBLICATIONS

Travis DeWolf ("A neural model of the motor control system", PHD thesis, Systems Design Engineering, University of Waterloo, Waterloo, Ontario, Canada, 2014, pp. 1-180) (Year: 2014).*
Escudero-Rodrigo et al. ("Distance-based Kernels for Dynamical Movement Primitives", Distance-based Kernels for Dynamical Movement Primitives, Artificial Intelligence Research and Development, vol. 277, IOS Press, 2015, pp. 1-10) (Year: 2015).*
Schaal et al. ("Control, planning, learning, and imitation with dynamic movement primitives". IEEE international conference on intelligent robots and systems, workshop on bilateral paradigms on humans and humanoids, 2003, pp. 1-21) (Year: 2003).*
Vinck et al. (The pairwise phase consistency: A bias-free measure of rhythmic neuronal NeuroImage 51 (2010), pp. 112-122) (Year: 2010).*
Aftab et al. ("A Novel Kernel for RBF Based Neural Networks", Abstract and Applied Analysis vol. 2014, Article ID 176253, Hindawi Publishing Corporation, pp. 1-10) (Year: 2014).*
Travis DeWolf ("NOCH: A framework for biologically plausible models of neural motor control", Masters Thesis, Mathematics in Computer Science, University of Waterloo, Waterloo, Ontario, Canada, 2010, pp. 1-106) (Year: 2010).*

* cited by examiner

*Primary Examiner* — Kakali Chaki
*Assistant Examiner* — Robert Lewis Kulp
(74) *Attorney, Agent, or Firm* — Elan IP Inc.

(57) ABSTRACT

A system continuously estimating the state of a dynamical system and classifying signals comprising a computer processor and a computer readable medium having computer executable instructions for providing: a module estimating of the state of a dynamical system assumed to be generated by a Dynamic Movement Primitive; a module classifying signals through inspecting dynamical system state estimates; and a coupling between the two modules such that classifications reset the dynamical system state estimate.

18 Claims, 3 Drawing Sheets

METHODS AND SYSTEMS FOR CONTINUOUS STATE ESTIMATION AND SIGNAL CLASSIFICATION WITH DYNAMIC MOVEMENT PRIMITIVES

FIELD OF THE INVENTION

The present invention relates to the field of continuous state estimation and signal classification, and in particular to gesture recognition and other subfields of artificial intelligence that require the continuous estimation of the underlying state of a high-dimensional system, and the classification of signals by analyzing the underlying state. The present invention can be readily implemented by neural networks.

BACKGROUND OF THE INVENTION

The present invention uses concepts from signal processing, dynamical systems theory, and motor control. Important terms and concepts will be briefly presented here.

A signal is a variable that changes over time. Signals that can be manipulated in a computer system often represent real phenomena in the world. For example, audio recordings correspond to physical air pressure changes, mobile device tap locations correspond to physical contact with a touchscreen, and so on.

Signal classification summarizes one or more signals as corresponding to a particular predefined class. For example, the audio recording of an utterance of the word "hello" would ideally be classified as corresponding to the word class "hello."

In a dynamical system, a system of equations defines how a point (called the state) will move through a vector space given some input. If we interpret the noisy measurements of a signal as reflecting the state of a dynamical system, then we can build up over time an estimation of the real underlying system state despite our measurements being noisy and spaced out over time. This is commonly known in statistics as the filtering problem, and is often solved with a Kalman filter (Kalman, 1960) or a particle filter (Gordon et al., 1993).

The most common state estimation algorithm is the Kalman filter (Kalman, 1960). The Kalman filter keeps track of the state estimate $\hat{x}$ and the covariance matrix P, which captures linear relationships between the dimensions in $\hat{x}$. It is given some information about the dynamical system, including how to predict the next state given the current state, and how the system responds to external control signals. On each step of the algorithm (or continuously in the continuous-time variant), a prediction is made using the current state estimate, current covariance matrix, and external control signal. The state estimate and covariance matrix are updated based on whether the next observation matches the prediction. The Kalman filter optimally estimates state and covariance despite noisy observations for linear dynamical systems.

Several attempts have been made to extend the Kalman filter to nonlinear systems. The extended Kalman filter allows the next state to be any differentiable function of the current state. The Jacobian is evaluated on each timestep and incorporated into the update equations, essentially linearizing the nonlinear function around the current estimate. The unscented Kalman filter instead applies the unscented transform to the current estimate, generating a minimal set of samples that are used to update the mean and covariance without requiring the Jacobian. The unscented Kalman filter generally performs better in systems with many nonlinearities, which describes many real-world problems like robotic control.

The unscented Kalman filter is based on the idea that "it is easier to approximate a probability distribution than it is to approximate an arbitrary nonlinear function or transformation" (Julier and Uhlmann, 2004). However, recent developments, namely Dynamic Movement Primitives (DMPs; Schaal, 2006) and the Neural Engineering Framework (Stewart and Eliasmith, 2014), have successfully applied function approximation through linear summing of basis functions to dynamical problems including nonlinear trajectory generation (DeWolf, 2015). These methods have impressive scaling properties in terms of operating on very high-dimensional problems, and are able to approximate continuous nonlinear functions with arbitrary precision through using different types or different numbers of basis functions.

SUMMARY OF THE INVENTION

The current invention aims to apply DMPs to the state estimation problem in order to scale to high-dimensional problems with high accuracy.

The key idea of the present invention is to assume that the state being continuously estimated is generated by a DMP. Under this assumption, the state estimation problem can be decomposed into two simpler problems: comparing the overall state to the output of a given DMP, and estimating the underlying low-dimensional state of the given DMP. If we interpret each DMP as representing one signal to be classified, then the underlying low-dimensional state of that DMP tells us when that action has completed and therefore should be classified as having occurred.

In one embodiment of the invention, there is provided a method for continuous state estimation including a Dynamic Movement Primitive (DMP) implemented by a computer system for generating a control signal to guide a current state estimate; the control signal includes a point attractor and the current state estimate includes a canonical system being a low-dimensional dynamical system with simple linear dynamics; the DMP is configured to output a sum of the point attractor and a forcing function $f(x,g)$ computed from the low-dimensional canonical system state, x;

wherein the canonical system state is estimated as:

$$\dot{\hat{x}} = \begin{cases} c & \text{if sim } (s, f(x, g)) > th \\ 0 & \text{otherwise} \end{cases}$$

where:
  $\hat{x}$ is the current canonical system state estimate, which is initialized to be 0,
  c is a constant parameter controlling the speed at which $\hat{x}$ is advanced,
  s is the input signal representing external observations,
  $f(\hat{x}, g)$ is the forcing function evaluated for the state estimate $\hat{x}$ and goal g,
  sim is a similarity function computing a similarity between two vectors, and
  th is a constant threshold
continuously evaluating and outputting the canonical system state.

In one aspect of the invention, the similarity function is determined by:

$$\text{sim}(x, y) = \begin{cases} 0 & \text{if } \|x\| < 0.1 \\ \dfrac{x \cdot y}{\|x\|\|y\|} & \text{otherwise} \end{cases}$$

In another aspect of the invention, the canonical system state is estimated by an artificial neural network; wherein the artificial neural network receives s as an input and computes the canonical system state using recurrent couplings.

In another aspect of the invention, coupling weights of the recurrent couplings between neurons in the artificial neural network are determined through error-driven learning rules.

In another aspect of the invention, coupling weights of the recurrent couplings between neurons in the artificial neural network are determined through an offline optimization method.

In another aspect of the invention, there is provided a method for continuous signal classification including estimating by a computer system the state of a Dynamic Movement Primitive's canonical system using the method described above; upon a condition in which the DMP is a discrete DMP, outputting a classification when the estimated state is larger than a threshold value; upon a condition in which the DMP is a rhythmic DMP, outputting a classification when the angle of the two-dimensional state crosses a threshold value, whereby the classification is given by:

$$\text{classification} = \arccos \dfrac{\hat{x}_1}{\sqrt{\hat{x}_1^2 + \hat{x}_2^2}} > th^x$$

In another aspect of the invention, the canonical system state estimate and classifications are implemented with an artificial neural network; wherein the artificial neural network receives the system state estimate as an input and outputs classifications through activity in one or more output neurons; the output neurons being connected to state estimation neurons through coupling weights.

In another aspect of the invention, the coupling weights between state estimate neurons and output neurons are determined through error-driven learning rules.

In another aspect of the invention, the coupling weights between state estimate neurons and output neurons are determined through an offline optimization method.

In another aspect of the invention, implementing the threshold value is implemented through modifications of artificial neuron parameters by adjusting a background bias current of the neuron such that only inputs above the threshold elicit neural activity.

In another aspect of the invention, the canonical system state estimate is reset to 0 when a classification is output.

In another aspect of the invention, resetting the estimate to 0 is implemented by inhibiting the neurons representing the canonical system state.

In another aspect of the invention, resetting the canonical system state estimate is implemented by disinhibiting another neural network that drives the system state estimate to 0.

In another aspect of the invention, coupling weights between artificial neurons are determined through error-driven learning rules.

In another aspect of the invention, the coupling weights between artificial neurons are determined through an offline optimization method.

In another embodiment of the invention, there is provided a system for continuous state estimation and signal classification based on Dynamic Movement Primitives (DMPs); the DMPs implemented by a computer system for generating a control signal to guide a current state estimate; the control signal includes a point attractor and the current state estimate includes a canonical system being a low-dimensional dynamical system with simple linear dynamics; the computer processor estimates the state of a DMP's canonical system as $$\text{sim}(x, y) = \begin{cases} 0 & \text{if } \|x\| < 0.1 \\ \dfrac{x \cdot y}{\|x\| \|y\|} & \text{otherwise} \end{cases}$$

where:
  $\hat{x}$ is the current canonical system state estimate, which is initialized to be 0,
  c is a constant parameter controlling the speed at which $\hat{x}$ is advanced,
  s is the input signal representing external observations,
  $f(\hat{x}, g)$ is the forcing function evaluated for the state estimate $\hat{x}$ and goal g,
  sim is a similarity function computing a similarity between two vectors, and
  th is a constant threshold wherein:
all information is approximated using a plurality of nonlinear components and each nonlinear component is configured to generate an output in response to its input; and,
output from each nonlinear component is weighted by coupling weights and weighted outputs are provided to coupled nonlinear components;
and wherein the system is configured to:
represent the DMP canonical system state estimate with a plurality of nonlinear components that are recurrently coupled;
emit classifications through one or more nonlinear components that become active when the system state estimate reaches a given threshold;
reset the canonical system state estimate when a classification occurs through attenuating the plurality of nonlinear components representing the canonical system state estimate.

In another aspect of the invention, each nonlinear component has a tuning curve that determines the output generated by the nonlinear component in response to any input; the tuning curve for each nonlinear component being generated randomly.

In another aspect of the invention, the nonlinear components are software simulations of neurons.

In another aspect of the invention, the simulated neurons generate spikes.

In another aspect of the invention, the components are implemented in special purpose hardware including neuromorphic hardware.

BRIEF DESCRIPTION OF THE DRAWINGS

For a more complete understanding of the invention, reference is made to the following description and accompanying drawings, in which.

DETAILED DESCRIPTION OF EXEMPLARY EMBODIMENTS

For simplicity and clarity of illustration, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. Program code is applied to input data to perform the functions described herein and to generate output information. The output information is applied to one or more output devices, in known fashion.

Furthermore, the systems and methods of the described embodiments are capable of being distributed in a computer program product including a physical, nontransitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer usable instructions may also be in various forms, including compiled and non-compiled code.

It should also be noted that the terms coupled or coupling as used herein can have several different meanings depending on the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal or a mechanical element depending on the particular context. Furthermore, the term communicative coupling may be used to indicate that an element or device can electrically, optically, or wirelessly send data to another element or device as well as receive data from another element or device.

The described embodiments are methods, systems and apparatus that generally provide for estimating dynamical system state and classifying signals. As used herein the term 'neuron' refers to spiking neurons, continuous rate neurons, or arbitrary nonlinear components used to make up a distributed system.

The described systems can be implemented using a combination of adaptive and non-adaptive components. The system can be efficiently implemented on a wide variety of distributed systems that include a large number of nonlinear components whose individual outputs can be combined together to implement certain aspects of the system as will be described more fully herein below.

Examples of nonlinear components that can be used in various embodiments described herein include simulated/artificial neurons, FPGAs, GPUs, and other parallel computing systems. Components of the system may also be implemented using a variety of standard techniques such as by using microcontrollers. Also note the systems described herein can be implemented in various forms including software simulations, hardware, or any neuronal fabric. Examples of mediums that can be used to implement the system designs described herein include Neurogrid, Spinnaker, OpenCL, and TrueNorth.

Previous approaches to continuous state estimation (e.g., Kalman, 1960; Gordon et al., 1993) treat observations as noisy estimates of the underlying state of the system. For example, when solving a robotic control problem, noisy measurements of joint angles are used to estimate the true joint angles. These approaches work well for low-dimensional problems with linear interactions between dimensions of the state, but do not scale well to high-dimensional problems with many nonlinear interactions.

By contrast, the present invention treats observations as noisy estimates of the output of a Dynamic Movement Primitive (DMP), which is generated by a system with simple dynamics. For example, when solving a robotic control problem, noisy measurements of joint angles are used to estimate the robot's progress through a movement that has previously been described with a DMP.

The DMP framework provides a method for planning and controlling trajectories that is stable and scalable to many degrees of freedom. For clarity and completeness, a description of a simple non-rhythmic DMP follows (see Schaal, 2006 for more details).

A DMP is composed of two separate dynamical systems: a point attractor and a "canonical system." The point attractor pushes the system state toward a known goal, g, with dynamics defined as $$\tau \ddot{y} = \alpha_y(\beta_y(g-y)-\dot{y}) + f(x,g),$$

where y is the system state, $\dot{y}$ is the system velocity, and $\alpha_y$ and $\beta_y$ are gain terms. $\tau$ is a scaling term controlling the speed of the DMP.

x is the canonical system state, and $f(x,g)$ is a function of that state called the "forcing function." The canonical system evolves with dynamics defined as $$\tau \dot{x} = \begin{cases} 1 & \text{if } x < 1 \\ 0 & \text{if } x \geq 1 \end{cases},$$

Typically, the initial value of x is 0, so the forcing function is defined over the range [0, 1]. The dimensionality of the forcing function matches the dimensionality of the point attractor, which can be of any dimensionality. Thus, despite the simplicity of the canonical system, arbitrary high-dimensional trajectories can be generated through a point attractor and a one-dimensional integrator.

In the subsequent exemplary embodiments, the state of the canonical system, x, will be estimated by interpreting a signal as being the output of the forcing function, $f(x,g)$. Since this is the inverse of the trajectory generation problem that DMPs solve, we call the present invention an inverse DMP (iDMP).

While the forcing function in a DMP can be directly computed, it is instead usually computed as the weighted sum over a set of basis function (e.g., a set of Gaussian bumps with shifted means to tile the vector space). A key benefit of this choice is that it enables DMPs to be naturally implemented in neural networks (see DeWolf, 2015 for more details).

iDMPs also exhibit this property. While ideal basis functions can implement most functions more accurately, neural networks provide advantages in situations in which the function is not fully known beforehand. Further, systems that can be implemented with spiking neural networks can yield significant power efficiency advantages (see Hunsberger and Eliasmith, 2015), and speed advantages when implemented with neuromorphic hardware (see Mundy et al., 2015).

The embodiments that will be subsequently described use spiking neurons to demonstrate that the present invention can take advantage of the power efficiency and speed benefits of neuromorphic hardware. Superior accuracy and speed on general purpose computational hardware can be obtained using non-neural basis functions or non-spiking neuron models. However, we show satisfactory performance despite using a spiking neuron model. To accomplish this, we use the principles of the Neural Engineering Framework (NEF; Stewart and Eliasmith, 2014); however, any method of computing arbitrary functions on vectors in neural networks could be used.

Figure 1:
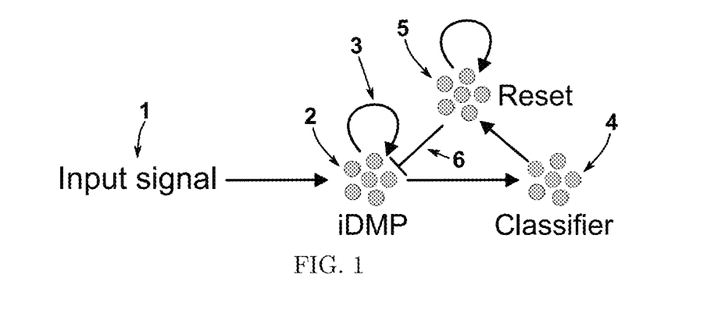
FIG. 1 is a diagram of the overall architecture of the system.

The general network structure of these embodiments consist of three ensembles of leaky integrate-and-fire (LIF) neurons, and is depicted in FIG. 1. The input signal [1] is multidimensional, and can be thought of as the noisy observations from some dynamical process. The "iDMP" ensemble [2] encodes a vector with dimensionality one greater than the dimensionality of the input signal; the additional dimension contains the current estimate of the DMP canonical system state x. A recurrent connection [3] from the iDMP ensemble to itself implements the state prediction function, which will be presented shortly. The iDMP ensemble projects the estimated state to the "classifier" ensemble [4]. The classifier neurons only receive sufficient input to become active when the estimated iDMP state ($\hat{x}$) reaches a certain threshold value, which indicates that the DMP associated with this iDMP network has been detected. After a successful classification, the classifier ensemble sends a signal to the "reset" ensemble [5], which has inhibitory connections [6] to the iDMP ensemble. That is, when the reset ensemble becomes active, the state of the iDMP ensemble is reset to 0, and it becomes insensitive to input for a short period of time.

As per the principles of the NEF, the important characteristics of each ensemble are the dimensionality of the vector space encoded by that ensemble, the number of neurons in the ensemble, and the tuning curves of those neurons. As previously mentioned, the iDMP ensemble has dimensionality one greater than the dimensionality of the input signal. 200 neurons per dimension were used in the experiments described below. The tuning curves are randomly generated, but could be modified if the distribution of the input signal is known a priori. The classifier ensemble is one-dimensional, and is composed of 100 neurons in the experiments described below. The tuning curves of the classifier neuron are all monotonically increasing (i.e., they all have a positive encoder) and have biases such that current corresponding to a certain threshold value must be present before the classifier neurons become active. The reset ensemble encodes a two-dimensional space with 50 neurons. The tuning curves of the reset ensemble's neurons are similar to the classifier ensemble in that there are parts of the vector space in which no neurons in the ensemble will be active. The first part of the vector space is the inside of the 2D space, meaning that the reset ensemble must receive a sufficient amount of input before any neuron will become active. The second part of the vector space is most of the second quadrant. The recurrent connection in the reset ensemble causes it to oscillate when given a burst of sufficient input; by having a dead zone in the second quadrant, the reset ensemble traverses its limit cycle only once (i.e., it is a one-shot oscillator). Making the reset ensemble a one-shot oscillator is necessary so that it is active long enough to fully silence the iDMP ensemble, but not so long that the iDMP ensemble is unable to make classifications in the future.

The important characteristic of a connection between ensembles is the function being computed across that connection. The connection from the iDMP ensemble to the classifier ensemble and the connection from the classifier ensemble to the reset ensemble implement simple linear functions. In the connection from the iDMP ensemble to the classifier ensemble, the first dimension of the iDMP ensemble (which tracks the current estimate of the canonical system state, $\hat{x}$) is sent unchanged to the classifier ensemble. Despite this, the classifier ensemble will only become active if the input signal is above some threshold (0.85 in the experiments subsequently described). In the connection from the classifier ensemble to the reset ensemble, the scalar value in the classifier ensemble is sent to the first dimension of the reset ensemble scaled with a gain of 10, which is sufficient to kick the reset ensemble out of its inner dead zone, starting the oscillation.

The recurrent connections in the iDMP and reset ensembles define the passive dynamics of these two ensembles. The reset ensemble's recurrent connection is linear with the following transform matrix.

$$T = \begin{bmatrix} 1 & 2\pi\tau f \\ 2\pi\tau f & 1 \end{bmatrix} \quad (1)$$

In Equation (1), $\tau$ is the time constant on the recurrent connection filter, and $f$ is the frequency of the oscillation. In order to fully silence the iDMP, we set $f=\frac{1}{2}\tau$, meaning that the one-shot oscillator will inhibit the iDMP ensemble for approximately $2\tau$ seconds.

The recurrent connection in the iDMP aims to advance the system state estimate, $\hat{x}$, when the current input signal matches the iDMP's prediction, which is the result of evaluating the forcing function with the current system state estimate, $f(\hat{x}, g)$. Note that this requires the iDMP to know the DMP that it is attempting to estimate. The full equation on the recurrent connection on the iDMP ensemble is $$\dot{\hat{x}} = \begin{cases} 0 & \text{if } \|s\| < 0.1 \\ c & \text{if } \frac{s \cdot f(\hat{x}, g)}{\|s\| \|f(\hat{x}, g)\|} > th \\ 0 & \text{otherwise} \end{cases} \quad (2)$$

In Equation (2), c is a constant value that controls how much the state estimate is changed when the input signal is sufficiently similar to the forcing function prediction ($f(\hat{x}, g)$), and th is a threshold above which the similarity between the input signal and the prediction is considered sufficient. Note that the first case guards against input signals with very small magnitude, which result in the similarity computation yielding a high value regardless of the similarity between the two signals. This case can be omitted when input signals are known to always have sufficiently large magnitudes.

To evaluate the performance of this and subsequent iDMP embodiments, we measure their ability to classify a sequence of input signals. In each experiment, we generate a number of random signals, then present them in a pre-defined sequence to each iDMP. An iDMP is constructed for each input signal, but the entire sequence of input signals is presented to all iDMPs to ensure that erroneous classifications and taken into account when evaluating the network.

Figure 2:
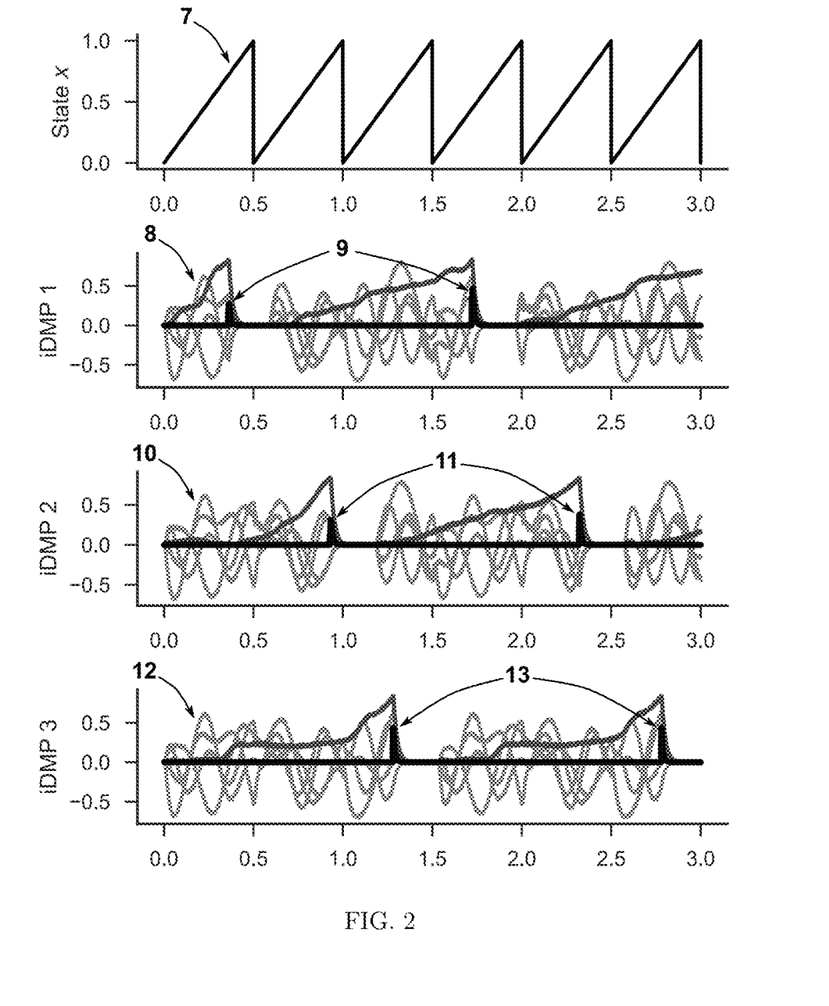
FIG. 2 is the illustration of plots showing example system output from one trial of the system performing a state estimation and signal classification task.

FIG. 2 shows an example trial from one experiment. The first plot [7] shows the actual underlying DMP canonical system state that will be estimated. The second plot [8] shows the decoded output of the iDMP ensemble in grey, and the decoded output of the classifier ensemble in black. The lighter grey lines are used for dimensions tracking the input signals, while the darker grey lines are used for the estimated state. iDMP 1 corresponds to the signal presented from 0.0-0.5 seconds, and from 1.5-2.0 seconds. Classifications are emitted correctly, at times 0.41 s and 1.75 s [9]. The third plot [10] shows the decoded output of the second iDMP, which is presented from 0.5-1.0 seconds, and from 2.0-2.5 seconds. Classifications are emitted correctly, at times 0.95 s and 2.39 s [11]. The fourth plot [12] shows the decoded output of the third iDMP, which is presented from 1.0-1.5 seconds, and from 2.5-3.0 seconds. Classifications are emitted correctly, at times 1.28 s and 2.78 s [13].

Performance for these experimental trials is measured using the following accuracy metric.

$$Acc = \frac{N - S - D - I}{N}, \quad (3)$$

In Equation (3), N is the number of signals in the sequence of input signals. S is the number of substitutions (i.e., the wrong input signal is classified), D is the number of deletions (i.e., a signal was not classified), and I is the number insertions (i.e., a signal was erroneously classified).

Normalizing by the total number of signals means that perfect performance is 1. Making no classifications results in performance of 0, and negative accuracy is possible through many erroneous classifications. Chance performance is not possible to determine as the network is operating continuously in time, meaning that a classification can occur at any moment, not only after the presentation of an input signal. However, we will consider as a baseline an accuracy score of 1 over the number of iDMPs (e.g., ⅓ when there are three possible input signals, and therefore three iDMPs). This corresponds to a classification technique that makes the correct number of classifications (which itself is a non-trivial problem to solve), but randomly selects which signal is classified.

The accuracy metric in Equation (3) is computed by expressing the sequence of input signals and classifications as strings (e.g., "012012" represents presentation or classification of three input signals in sequence). Classification by the iDMP network is defined as any activation in the classification ensemble. The two strings are aligned using the Needleman-Wunsch algorithm; misaligned parts of the post-alignment strings can be grouped as a deletion, insertion, or substitution based on the characters in the post-alignment strings.

Three experiments were performed to test the iDMP's performance as a function of 1) the frequency of the input signal, 2) the length of the input signal, and 3) the dimensionality of the input signal. In all experiments, three band-limited white noise signals were randomly generated. The full input sequence consisted of each signal presented one after another, with each signal presented twice, so in total the input sequence was six signals long. An iDMP corresponding to each signal was created and provided the full sequence as input. Each experiment was repeated 50 times. Other important parameters used in the experiments are listed in Table 1.

TABLE 1

Parameters used in experiments, unless otherwise stated.

| Parameter | Value |
| --- | --- |
| Number of input signals (n) | 3 signal |
| Signal dimensionality (t) | 8 dimensions |
| Signal upper frequency limit (f) | 5 Hz |
| Signal length (t) | 500 ms |
| State update scale (c) | 1.3 − 0.7(t − 0.75) + 0.005(d − 4) + 0.003f |
| Similarity threshold (th) | 0.93 − 0.03d − 0.00065f |

Figure 3:
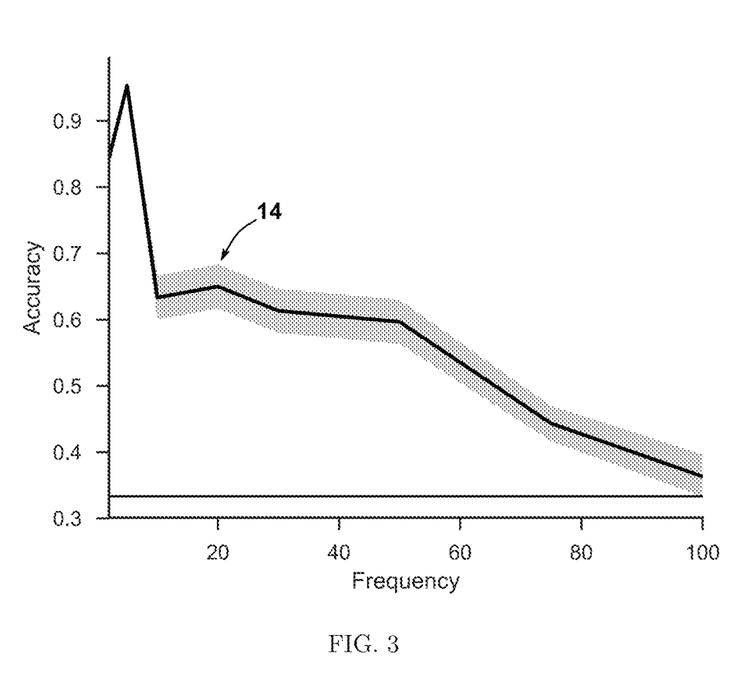
FIG. 3 is a the illustration of a plot showing performance of the iDMP network for signals with varying frequency content.

In the first experiment, the upper limit of the band-limited white noise signals were varied to determine limitations in the types of signals that be robustly classified. Experiments were run with upper limits of 2, 5, 10, 20, 30, 50, 75, and 100 Hz. FIG. 3 shows that accuracy [14] remains significantly above baseline until 100 Hz. In general, performance degrades with higher frequency signals. Note that in this and subsequent plots, shaded regions represent 95% confidence intervals.

Figure 4:
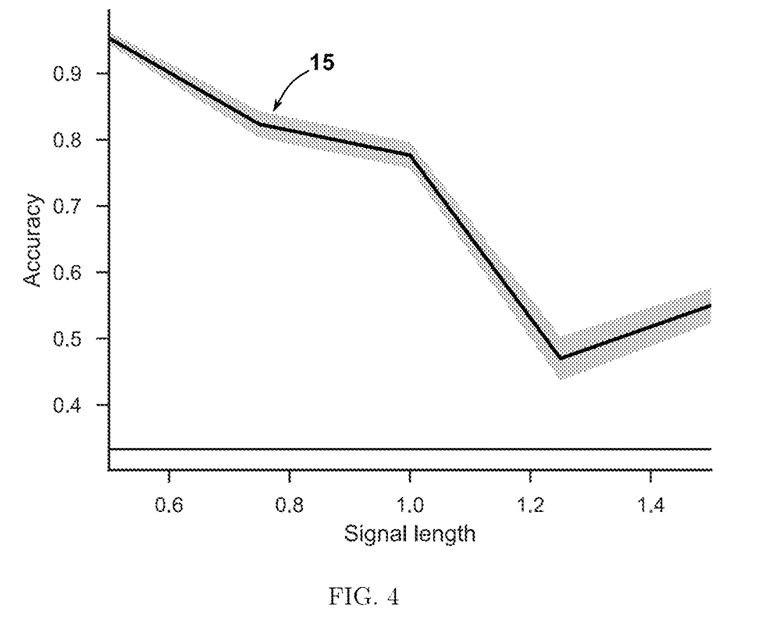
FIG. 4 is a the illustration of a plot showing performance of the iDMP network for signals with varying signal length.

In the second experiment, the length of the band-limited white noise signals were varied to determine limitations in the types of signals that be robustly classified. Experiments were run with signal lengths of 0.5, 0.75, 1.0, 1.25, and 1.5 seconds. FIG. 4 shows that accuracy [15] remains significantly above baseline across all signal lengths tested, though performance is better for shorter signals than for longer signals.

Figure 5:
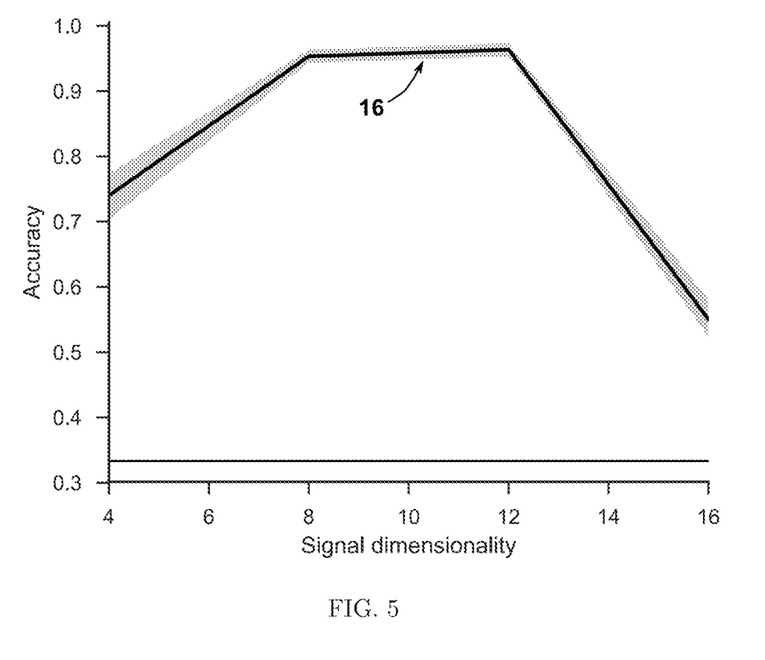
FIG. 5 is a the illustration of a plot showing performance of the iDMP network for signals with varying signal dimensionality.

In the third experiment, the dimensionality of the band-limited white noise signals were varied to determine limitations in the types of signals that be robustly classified. Experiments were run with signal dimensionality of 4, 8, 12, and 16. FIG. 5 shows that accuracy [16] remains significantly above baseline for all signal dimensionality values tested.

Note that in the experiments depicted, the similarity threshold and scale parameters are functions of characteristics of the input signals, specifically length and dimensionality. These parameters have a large effect on the performance of iDMP networks. However, these are simple heuristics used to achieve an acceptable level of performance; better performance is possible through full systematic explorations of the parameter space.

The aforementioned embodiments have been described by way of example only. The invention is not to be considered limiting by these examples and is defined by the subsequent claims.

REFERENCES

T. DeWolf. *A neural model of the motor control system*. PhD thesis, University of Waterloo, 2015.

N. J. Gordon, D. J. Salmond, and A. F. M. Smith. Novel approach to nonlinear/non-gaussian bayesian state estimation. In *IEEE Proceedings F—Radar and Signal Processing*, volume 140, pages 107-113. IET, 1993.

E. Hunsberger and C. Eliasmith. Spiking deep networks with LIF neurons. *arXiv preprint arXiv:1510.08829*, 2015.

S. J. Julier and J. K. Uhlmann. Unscented filtering and nonlinear estimation. *Proceedings of the IEEE*, 92(3): 401-422, 2004.

R. E. Kalman. A new approach to linear filtering and prediction problems. *Journal of Basic Engineering*, 82(1): 35-45, 1960.

A. Mundy, J. Knight, T. C. Stewart, and S. Furber. An efficient SpiNNaker implementation of the Neural Engineering Framework. In 2015 *International Joint Conference on Neural Networks (IJCNN)*, pages 1-8. IEEE, 2015.

S. Schaal. Dynamic movement primitives-a framework for motor control in humans and humanoid robotics. In *Adaptive Motion of Animals and Machines*, pages 261-280. Springer, 2006.

T. C. Stewart and C. Eliasmith. Large-scale synthesis of functional spiking neural circuits. *Proceedings of the IEEE*, 102(5):881-898, May 2014. ISSN 0018-9219. doi: 10.1109/JPROC.2014.2306061.

What is claimed is:

1. A method for continuous state estimation and state classification comprising:
    implementing, by a computer system, a dynamic movement primitive (DMP) for generating a control signal for gesture recognition to guide a current gesture state estimate;
    said control signal includes a point attractor and said current state estimate includes a canonical system being a low-dimensional dynamical system with simple linear dynamics;
    said DMP configured to output a sum of said point attractor and a forcing function $f(x,g)$ computed from a low-dimensional canonical system state, x;
    wherein said canonical system state is estimated as:

$$\dot{\hat{x}} = \begin{cases} c & \text{if } \text{sim}(s, f(\hat{x}, g)) > th \\ 0 & \text{otherwise} \end{cases}$$

where:
    $\hat{x}$ is the current canonical system state estimate, and is initialized to 0,
    c is a constant parameter controlling the speed at which $\hat{x}$ is advanced,
    s is the input signal representing external observations,
    $f(x,g)$ is the forcing function evaluated for the state estimate $\hat{x}$ and goal g,
    sim is a similarity function computing a similarity between two vectors, and
    th is a first constant threshold;
    continuously evaluating and outputting said canonical system state;
    upon a condition in which the DMP is a discrete DMP, outputting a classification when the estimated state $\hat{x}$ is larger than a threshold value;
    upon a condition in which the DMP is a rhythmic DMP, outputting a classification when an angle of a two-dimensional state crosses a threshold value, whereby said classification is given by:

$$\text{classification} = \arccos \frac{\hat{x}_1}{\sqrt{\hat{x}_1^2 + \hat{x}_2^2}} > th^x,$$

where $th^x$ is a second constant threshold;
    wherein the canonical system state estimate and classifications are implemented with an artificial neural network; wherein said artificial neural network receives the system state estimate as an input and outputs classifications through activity in one or more output neurons; said output neurons being connected to state estimation neurons through coupling weights; and
    wherein implementing the threshold value is implemented through modifications of artificial neuron parameters.

2. The method of claim 1, wherein said similarity function is determined by:

$$\text{sim}(x, y) = \begin{cases} 0 & \text{if } \|x\| < 0.1 \\ \frac{x \cdot y}{\|x\| \|y\|} & \text{otherwise} \end{cases}.$$

3. The method of claim 1, wherein the canonical system state is estimated by an artificial neural network; wherein the artificial neural network receives s as an input and computes said canonical system state using recurrent couplings.

4. The method of claim 3, wherein coupling weights of said recurrent couplings between neurons in the artificial neural network are determined through error-driven learning rules.

5. The method of claim 3, wherein coupling weights of said recurrent couplings between neurons in the artificial neural network are determined through an offline optimization method.

6. The method of claim 1, wherein said coupling weights between state estimate neurons and output neurons are determined through error-driven learning rules.

7. The method of claim of claim 1, wherein the coupling weights between state estimate neurons and output neurons are determined through an offline optimization method.

8. The method of claim 1, wherein implementing the threshold value is implemented through modifications of artificial neuron parameters by adjusting a background bias current of the neuron such that only inputs above the threshold elicit neural activity.

9. The method of claim 1, wherein the canonical system state estimate is reset to 0 when a classification is output.

10. The method of claim 9, wherein resetting the estimate to 0 is implemented by inhibiting the neurons representing the canonical system state.

11. The method of claim 10, wherein resetting the canonical system state estimate is implemented by disinhibiting another neural network that drives the system state estimate to 0.

12. The method of claim 10, wherein coupling weights between artificial neurons are determined through error-driven learning rules.

13. The method of claim 10, wherein the coupling weights between artificial neurons are determined through an offline optimization method.

14. A system for continuous state estimation and signal classification based on dynamic movement primitives (DMOs); said DMPs implemented by a computer system for generating a gesture recognition control signal to guide a current state estimate; said control signal includes a point attractor and said current state estimate includes a canonical system being a low-dimensional dynamical system with simple linear dynamics; said computer processor estimates the state of a DMP's canonical system as $$\dot{\hat{x}} = \begin{cases} c & \text{if } \text{sim}(s, f(\hat{x}, g)) > th \\ 0 & \text{otherwise} \end{cases}$$

where:
$\hat{x}$ is the current canonical system state estimate, and is initialized to 0,
c is a constant parameter controlling the speed at which $\hat{x}$ is advanced,
s is an input signal representing external observations,
$f(x,g)$ is a forcing function evaluated for the state estimate a $\hat{x}$ goal g,
sim is a similarity function computing a similarity between two vectors, and
th is a first constant threshold
wherein:
all information is approximated using a plurality of nonlinear components and each nonlinear components is configured to generate an output in response to its input; and,
output from each nonlinear component is weighted by coupling weights and weighted outputs are provided to coupled nonlinear components;
and wherein the system is configured to:
represent the DMP canonical system state estimate with a plurality of nonlinear components that are recurrently coupled;
emit classifications through one or more nonlinear components that become active when the system state estimate reaches a given threshold;
reset the canonical system state estimate when a classification occurs through attenuating the plurality of nonlinear components representing the canonical system state estimate;
wherein the classifications are determined by the computer processor executing an algorithm in which:
upon a condition in which the DMP is a discrete DMP, outputting a classification when the estimated state $\hat{x}$ is larger than a threshold value;
upon a condition in which the DMP is a rhythmic DMP, outputting a classification when an angle of a two-dimensional state crosses a threshold value,
whereby said classification is given by:

$$\text{classification} = \arccos \frac{\hat{x}_1}{\sqrt{\hat{x}_1^2 + \hat{x}_2^2}} > th^x,$$

where $th^x$ is a second constant threshold;
wherein the canonical system state estimate and classifications are implemented with an artificial neural network; wherein said artificial neural network receives the system state estimate as an input and outputs classifications through activity in one or more output neurons; said output neurons being connected to state estimation neurons through coupling weights; and
wherein implementing the threshold value is implemented through modifications of artificial neuron parameters.

15. The system of claim 14, wherein each nonlinear component has a tuning curve that determines the output generated by the nonlinear component in response to any input; said tuning curve for each nonlinear component being generated randomly.

16. The system of claim 15, wherein the nonlinear components are software simulations of neurons implemented using artificial neural networks.

17. The system of claim 16, wherein the simulated neurons generate spikes.

18. The system of claim 15, wherein the system is implemented in special purpose hardware including neuromorphic hardware.

* * * * *